Figure 1:
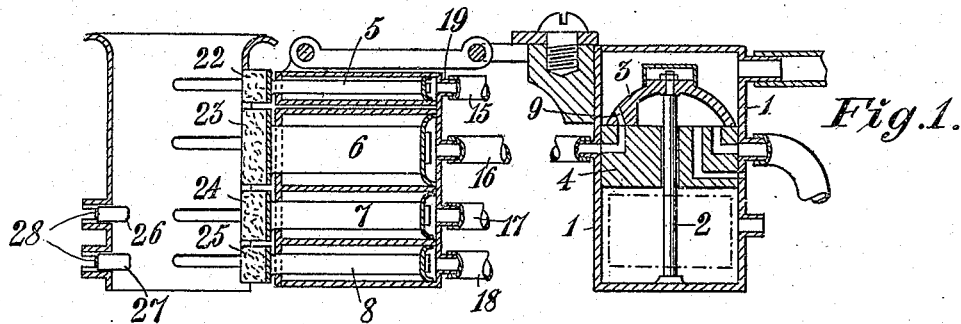

G. E. JONSON.
MILKING MACHINE.
APPLICATION FILED FEB. 25, 1908.

936,907.

Patented Oct. 12, 1909.
2 SHEETS—SHEET 1.

Witnesses
August Sorensen
Ernie Wahlberg

Inventor
Gustaf E. Jonson
by Graham
Att'y

G. E. JONSON.
MILKING MACHINE.
APPLICATION FILED FEB. 25, 1908.

936,907.

Patented Oct. 12, 1909.
2 SHEETS—SHEET 2.

Witnesses

Inventor

UNITED STATES PATENT OFFICE.

GUSTAF EMIL JONSON, OF HJERPÅS, SWEDEN.

MILKING-MACHINE.

936,907.  Specification of Letters Patent.  Patented Oct. 12, 1909.

Application filed February 25, 1908. Serial No. 417,701.

*To all whom it may concern:*

Be it known that I, GUSTAF EMIL JONSON, a subject of the King of Sweden, and resident of Hjerpås, in the Kingdom of Sweden, have invented new and useful Improvements in Milking-Machines, of which the following is a specification, reference being had to the drawings accompanying and forming a part hereof.

This invention relates to milking machines and particularly to milking machines in which the teats are operated by pistons actuated by compressed air or other pressure fluid.

One object of the invention is to provide means for positively distributing the pressure fluid and, thereby, to make it possible to operate the teats one after the other, by which the cow is not troubled in the same degree as when the teats are operated simultaneously.

A further object of the invention is to provide a uniform pressure upon the teats commencing at the root of each teat and continuing downwardly toward the end thereof.

A further object of the invention is to enable the machine to automatically adjust itself to the lengths of the teats, so that the longer the teats, the more pistons will be thrown into action.

Other objects of the invention will hereinafter appear.

With these objects in view, the invention consists, chiefly, in the combination with the pistons, of a conduit adapted to supply the machine with pressure fluid, and means situated in the said conduit for distributing the pressure fluid to the pistons, preferably in such a manner that one series of pistons will be caused to work after the other, commencing with the uppermost piston and continuing downwardly to the lowermost one of each series.

The distributing means may, suitably, consist of a rotary valve, preferably arranged in such a manner that the friction is reduced to a minimum. The pistons may have cushions attached to the ends thereof entering the teat cup, said cushions being, preferably, of unequal sizes, the uppermost piston having, preferably, a cushion of a very small extension in the longitudinal direction of the teat cup so as to merely cut off the interior of the teat from the udder, whereas the following piston should, preferably, have a comparatively long cushion so as to be able to press out the bulk of the milk contained within the teat, the following piston or pistons having cushions of smaller sizes decreasing downwardly, toward the end of the teat. The lowermost piston or pistons preferably coöperate with press buttons situated diametrically opposite thereto, or with other means connected to a locking device for the corresponding piston, in such a manner that the said locking device is released, when the press button, or corresponding means, is pressed out by the pressure of the teat thereon. When the teat is not sufficiently long to reach the lowermost piston or pistons, no disengagement of the latter can take place.

Figure 2:
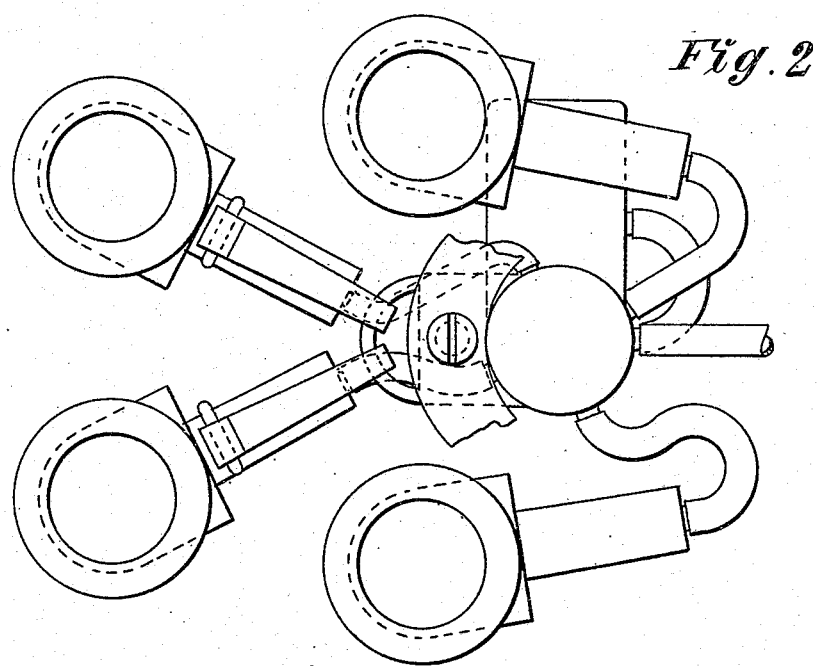
Figure 3:
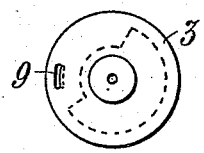
Figure 7:
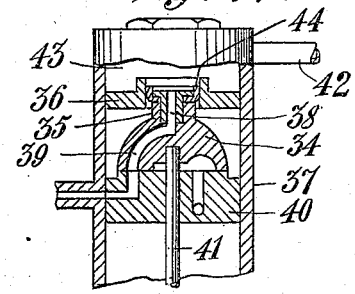
Figure 5:
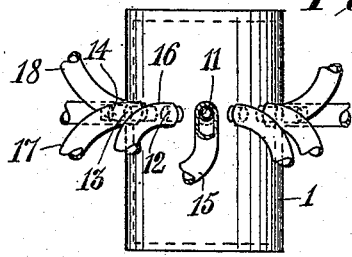
Figure 8:
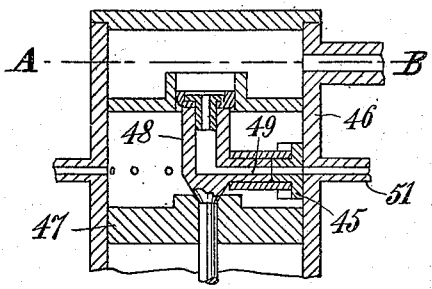
Figure 6:
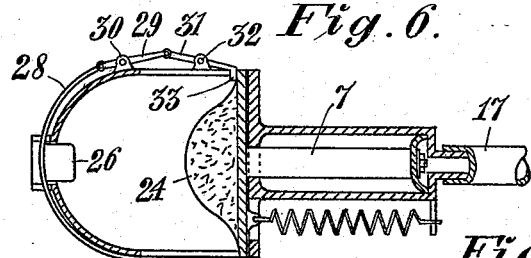
Figure 9:
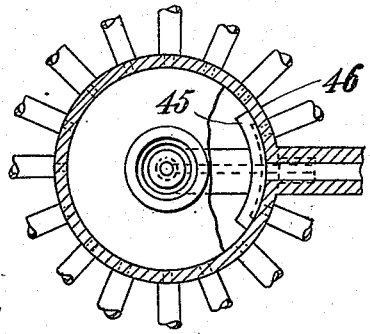
Figure 10:
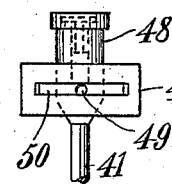

In the drawings, Figure 1 is a vertical section of a milking machine arranged according to this invention. Fig. 2 is a plan view of the same machine. Figs. 3 to 6 show details appertaining to the same machine. Fig. 7 is a vertical section of a modified construction of the rotary valve serving to distribute the pressure fluid to the pressure cylinders. Fig. 8 is a vertical section of a second modification of the said rotary valve. Fig. 9 is a horizontal section on line A—B of Fig. 8. Fig. 10 is a side elevation of the rotary valve shown in Figs. 8 and 9.

Figure 4:
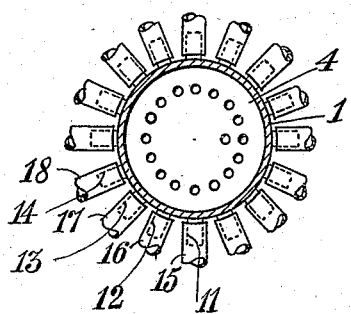

Referring to Figs. 1 to 6 of the drawings, 1 is a cylinder inclosing, in its lower part, a suitable engine (indicated by dotted lines), said engine being connected, through an axle 2, to the rotary valve 3. In the embodiment illustrated the rotary valve has the form of a hollow spherical calotte bearing with its lower, plane surface on the upper, plane surface of a disk 4 (Figs. 1 and 4) attached to the inside of the cylinder 1. Leading through the said disk, from the upper, plane surface to the periphery thereof, are passages each leading to one of the teat operating pistons. In the embodiment illustrated there are four pistons 5, 6, 7, 8 for each teat cup or, in all, sixteen pistons, the passages being, therefore, also sixteen in number. The pressure fluid is supplied from a compressor (not shown) suitably connected to a holder for obtaining a uniform current of fluid. The pressure fluid passes through the passage 9 in the rotary valve and is distributed, during the revolution of the rotary valve, to the passages in the disk 4, the upper, or inner, mouths of the said passages being arranged in a circle, as shown in Fig. 4. Fig. 4 shows the cylinder 1 having pipes or nipples 11, 12, 13, 14 forming an extension of the said passages, said pipes or nipples being connected to hoses 15, 16, 17, 18, or the like, leading to the pressure cylinders for the working pistons. In the drawing, the pipe 11 is shown connected, through the obliquely extending hose 15, to a pipe 19 leading to the interior of the uppermost pressure cylinder shown in Fig. 1. The following pipes 12, 13 and 14 are connected through hoses 16, 17, 18, respectively, to the following cylinders of the teat cup shown in Fig. 1. The following four pipes of the cylinder 1 are connected, in the same order, to the cylinders of the second teat cup, the following four pipes are connected, in order, to the cylinders of the third teat cup, and the last four pipes are connected, in order, to the cylinders of the fourth teat cup. By this arrangement the teats are operated at different times, one after the other, in a continuous cycle, until the udder is empty. Hereby the advantage is gained that the cow is not troubled in such a degree as when all four teats are operated at once.

Situated at the end of each piston 5, 6, 7, 8 is a cushion 22, 23, 24, 25, respectively. Preferably, the cushion 22 carried by the uppermost piston 5 is of a short extension in the longitudinal direction of the teat cup, said cushion having merely for its object to cut off the interior of the teat from the udder, before the teat is operated by the following cushion 23 which has, preferably, a comparatively large extension in the longitudinal direction of the teat cup. The cushions 23, 24 and 25 suitably decrease in longitudinal extension from the upper one 22 toward the lowermost one 25. By this arrangement the teat is operated in the most practical way, and the milk is completely pressed out. The diameters of the pressure cylinders are, preferably, measured in proportion to the sizes of the cushions by which a uniform pressure of the cushions is obtained.

Placed in the wall of each teat cup, diametrically opposite to the two lowermost cushions 24 and 25, are movable buttons 26, 27 of india rubber or other suitable material, said buttons being kept in position by springs 28 of such a tension that the said buttons press against the lower part of the teat without being pressed outward thereby, if the said part of the teat is not sufficiently large and hard. The springs 28 are shown connected to a lever 29 adapted to turn about a pivot pin 30 at the outer side of the teat cup. The other end of the said lever is shown connected to a second lever 31 pivoted about a pin 32. The lever 31 is shown provided with a pawl 33 projecting through a slot in the wall of the teat cup. When a button 26 or 27 is pressed out, against the action of the spring 28, the levers 29, 31 are turned so that the pawl 33 is retracted and the corresponding piston is free to move under the influence of the pressure in its cylinder. This arrangement is of a great importance since the machine is, thereby, automatically adjusted to the lengths of the teats.

In the construction of the rotary valve illustrated in Fig. 7 the valve 34 has an extension, at the top, in the shape of a hollow plug 35 entering a round hole in the upper wall 36 of the valve casing 37. The bore 38 of the plug is extended through a passage 39 in the rotary valve to the lower surface thereof which is in contact with the upper surface of a disk 40 having passages arranged in the same manner as those described with reference to Figs. 1 and 4. The rotary valve may be rotated by a suitable motor, power transmission, or the like, situated in the lower part of the cylinder 37, or by hand power transmitted to the axle 41 of the rotary valve in any suitable manner, for instance by a worm and worm wheel. The pressure fluid is supplied through a tube 42 to the chamber 43, which is shut off by the wall 36 from the valve chamber. From the chamber 43 the pressure fluid passes through the passages 38 and 39 in the rotary valve into the passages in the disk 40. The plug may, suitably, be provided, at its outer side, with an air-tight packing 44. By this arrangement the pressure on the upper side of the rotary valve is essentially reduced, since only the upper surface of the hollow plug is exposed to the pressure within the chamber 43.

The embodiment illustrated in Figs. 8 to 10, inclusive, differs in construction from that above described essentially as regards the form of the rotary valve 45 and in that the passages leading to the pressure cylinders are arranged in the wall of the cylinder 46, instead of in the disk 47. The rotary valve has the form of a circular segment whose outer cylindrical surface bears on the inner side of the cylinder 46. Suitably, the rotary valve is made integral with the hollow plug 48. The passage 49 in the rotary valve opens into a longitudinal slot 50 in the outer side of the said valve, said slot being so located as to embrace one or more of the passages 51 leading to the pressure cylinders. When the valve is rotated, the pressure fluid is, thus, distributed in the same manner as hereinbefore described.

Having now described my invention, what I claim as new and desire to secure by Letters Patent is:—

1. In a milking machine the combination of teat cups, pistons arranged in series along the said teat cups, transversely thereto, each series of pistons being adapted to operate one of the teats from the root toward the end thereof, a conduit adapted to supply the machine with pressure fluid, a rotary valve situated in the said conduit, and conduits leading to the pistons and controlled by the said rotary valve so that pressure fluid is conducted to one series of pistons after the other, substantially as and for the purpose set forth.

2. In a milking machine the combination of teat cups, pistons arranged in series along the said teat cups, transversely thereto, cushions of different sizes attached to the said pistons, the uppermost cushion being smallest and the areas of the pistons being proportional to the sizes of the cushions carried thereby, a conduit adapted to supply the machine with pressure fluid, and means situated in the said conduit for distributing the pressure fluid to one series of pistons after the other, substantially as and for the purpose set forth.

3. In a milking machine the combination of teat cups, pistons arranged in series along the said teat cups, transversely thereto, cushions of different sizes attached to the said pistons, the uppermost cushion being smallest, the next cushion being largest and the following cushions having intermediate sizes decreasing downwardly, the areas of the pistons being proportional to the sizes of the cushions carried thereby, a conduit adapted to supply the machine with pressure fluid, and means situated in the said conduit for distributing the pressure fluid to one series of pistons after the other, substantially as and for the purpose set forth.

4. In a milking machine the combination of teat cups, pistons arranged in series along the said teat cups, transversely thereto, a conduit adapted to supply the machine with pressure fluid, means situated in the said conduit for distributing the pressure fluid to one series of pistons after the other, means for preventing a lower piston from moving, and means adapted to be actuated by the lower part of the teat for releasing the said piston, when the teats are sufficiently long, substantially as and for the purpose set forth.

5. In a milking machine the combination of teat cups, pistons arranged in series along the said teat cups, transversely thereto, a conduit adapted to supply the machine with pressure fluid, means situated in the said conduit for distributing the pressure fluid to one series of pistons after the other, a pawl preventing a lower piston from moving, and a resilient press button situated in the teat cup diametrically opposite the said piston, said press button being connected to the said pawl in such a manner as to withdraw the latter, when the press button is pressed out by the teat, substantially as and for the purpose set forth.

6. In a milking machine the combination of teat cups, pistons arranged in series along the said teat cups, transversely thereto, a conduit adapted to supply the machine with pressure fluid, a valve casing situated at the end of the said conduit, a rotary valve having a hollow plug fitting air-tightly in a round hole in the said valve casing, and conduits leading to the pistons and controlled by the said rotary valve so that pressure fluid is conducted through the hollow plug of the valve to one series of pistons after the other, substantially as and for the purpose set forth.

7. In a milking machine the combination of teat cups, cylinders arranged in series along the said teat cups, transversely thereto, pistons working in the said cylinders, a conduit adapted to supply the cylinders with pressure fluid, a valve casing situated at the end of the said conduit, a rotary valve having a hollow plug fitting air-tightly in a round hole in the said valve casing, the interior of the said plug communicating, through a passage in the rotary valve, with a series of holes in the valve casing, when the valve is rotated, means for rotating the said valve, and conduits connecting the cylinders to the said holes in the valve casing in such a manner that pressure fluid is conducted through the rotary valve to one series of pistons after the other, substantially as and for the purpose set forth.

In testimony whereof I have signed my name to this specification in the presence of two subscribing witnesses.

GUSTAF EMIL JONSON.

Witnesses:
AUGUST SÖRENSEN,
FREDR. NORDSJDE.